Figures 1, 2, 3, 4:
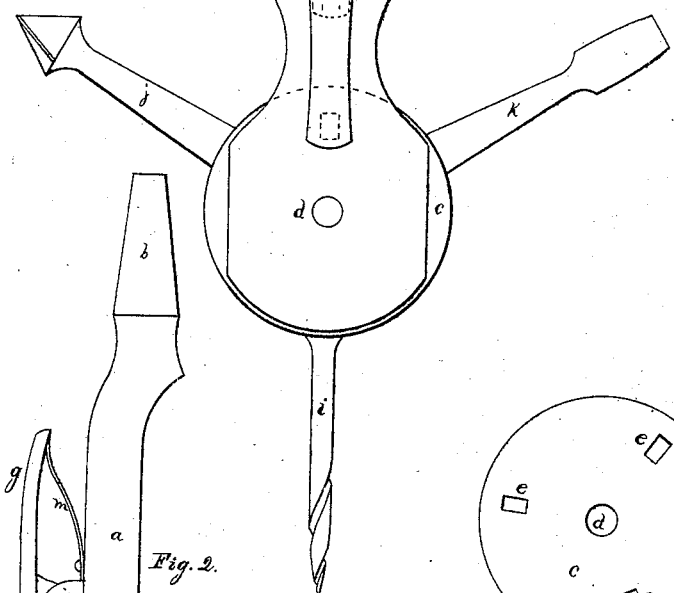

I. F. MURCH.
Tool-Holders.

No. 136,450.  Patented March 4, 1873.

Witnesses:
John E. Coffin
Nathan Wood

Inventor:
Ira F. Murch.
per Scribner & Jordan.
Attys

UNITED STATES PATENT OFFICE.

IRA F. MURCH, OF SUMNER, ASSIGNOR OF ONE-HALF HIS RIGHT TO DAVID TORREY, OF DEERING, MAINE.

IMPROVEMENT IN TOOL-HOLDERS.

Specification forming part of Letters Patent No. 136,450, dated March 4, 1873.

*To all whom it may concern:*

Be it known that I, IRA F. MURCH, of Sumner, in the county of Oxford and State of Maine, have invented a new and useful Improvement in Tool-Holders; and I hereby declare the following to be a full, clear, and exact description of the same, reference being had to the accompanying drawing, which is hereby made a part of this specification, in which—

Figure 1 is a side elevation of my invention. Fig. 2 is an edge view of same. Fig. 3 is an inside face view of the tool-bearing disk, and Fig. 4 an edge view of same.

Same letters show like parts.

The object of my invention is to produce a convenient means of using consecutively three or more different tools, such as are required to complete an operation; as, for instance, a bit, countersink, and screw-driver, which are very often used together for driving screws—the bit making the perforation to receive the screw; the countersink the recess for the head of the screw; and, lastly, the screw is turned into place by the screw-driver. In case these tools are held in different holders much time must necessarily be consumed in laying down one and taking up another at each step in the process; and it is to effect a saving of this time so lost that is the object of my invention.

I would remark that my invention may be used in a common bit-brace, or it may be operated by any other most convenient means which will give it the desired rotary motion.

My invention consists, first, of the central shaft $a$, Fig. 1, which, at its upper end at $b$, is made of the proper form to be inserted in a bit-brace, (which form is commonly that of the frustum of a pyramid, with a notch for a catch or set-screw,) and upon its lower end is made wider to form a bearing for the revolving disk $c$, Fig. 1 and Fig. 3, this disk being pivoted at $d$, upon which pivot it freely turns. This disk has upon its inner face the recesses $e\ e\ e$, Fig. 3, into which fits the projection $f$, Fig. 2, so that the disk is firmly held when the projection $f$, Fig. 2, fits into any one of the recesses $e\ e\ e$, Fig. 3; but, when the thumb-catch $g$, Fig. 2, is pressed upon the projection $f$, is removed from the recess $e$, and the disk may then be freely rotated upon its pivot $d$, Fig. 1. In the periphery of the disk $c$ chambers $h$ are made, which, in case a bit, countersink, and screw-driver are to be used, should be three in number; but a greater or less number may be made and used, as desired. One of these chambers is shown at $h$, Fig. 2. These chambers are for holding the shank of the tools, in which they are secured by the disk $c$ being split in half on a line at right angles to its line of motion, as shown in Fig. 4. The chambers $h\ h$ being made somewhat longer than the width of the shank of the tool, and the chamber $h$ being made wedge-shaped, as shown, as the two parts of the disk are rotated in opposite directions upon the binding screw or pivot $d$ the tools will be firmly held in their places. The tools must be held in a line with the radius of the disk $c$, and as they come around in their turn for use they must each be in line with the central shaft $a$.

The operation of my device is as follows: The end of the shaft $a$ is firmly fixed in a bit-brace or other revolving shaft, as described, and the different tools—as bit $i$, countersink $j$, and screw-driver $k$, Fig. 1—secured in any of the suggested modes. Then a perforation is made with the bit $i$, this being brought in line of the shaft $a$ for the purpose; pressure is then applied at $g$, which withdraws the projection $f$ from the recess $h$; the disk $c$ is rotated until the countersink $j$ is in line; and this again is held in place, as described, until used, when the screw-driver comes into place in the same manner.

The spring $m$, Fig. 2, serves to hold the projection $f$ in its position, unless pressed upon to remove it, as described heretofore.

What I claim as my invention, and desire to secure by Letters Patent, is—

The improved tool-holder, as shown, consisting of the shaft $a$, pivot $d$, disk $c$, recesses $e\ e\ e$, chambers $h\ h$, catch or detent $f$, thumb-latch $g$, and spring $m$, or their equivalents, when constructed and arranged substantially in the manner and for the purposes as set forth.

IRA F. MURCH.

Witnesses:
D. W. SCRIBNER,
F. E. JORDAN.